United States Patent [19]

Trantham

[11] Patent Number: 5,400,299
[45] Date of Patent: Mar. 21, 1995

[54] SEISMIC VIBRATOR SIGNATURE DECONVOLUTION

[75] Inventor: Eugene C. Trantham, Houston, Tex.

[73] Assignee: Exxon Production Research Company, Houston, Tex.

[21] Appl. No.: 109,803

[22] Filed: Aug. 20, 1993

[51] Int. Cl.[6] .............................................. G01V 1/00
[52] U.S. Cl. ...................................... 367/38; 367/43; 367/190; 367/46; 181/108
[58] Field of Search ....................... 367/21, 23, 38, 43, 367/46, 47, 48, 49, 190; 181/108, 121

[56] References Cited

U.S. PATENT DOCUMENTS

| | | | |
|---|---|---|---|
| 2,779,428 | 1/1957 | Silverman | 181/0.5 |
| 3,182,743 | 5/1965 | McCollum | 181/0.5 |
| 3,437,999 | 4/1969 | Landrum, Jr. | 340/15.5 |
| 3,629,800 | 12/1971 | Schneider | 340/15.5 |
| 3,705,382 | 12/1972 | Quay | 340/15.5 |
| 4,688,198 | 8/1987 | Wiggins | 367/46 |
| 4,752,916 | 6/1988 | Loewenthal | 367/24 |
| 4,893,694 | 1/1990 | Houck et al. | 181/111 |
| 4,922,362 | 5/1990 | Miller et al. | 367/46 |
| 5,050,130 | 9/1991 | Rector et al. | 367/41 |
| 5,151,882 | 9/1992 | Kingman | 367/82 |
| 5,173,880 | 12/1992 | Duren et al. | 367/73 |
| 5,253,217 | 10/1993 | Justice, Jr. et al. | 367/46 |

OTHER PUBLICATIONS

Arya and Holden, "A Geophysical Application: Deconvolution of Seismic Data", pp. 324-338 of *Digital Signal Processing*, Western Periodicals Co., N. Hollywood, Calif., 1979.

Kirk, P., "Vibroseis Processing", Chapter 2 of *Developments in Geophysical Exploration Methods*—2, edited by A. Fitch, Applied Science Publishers Ltd., London, 1981, pp. 37-52.

Robinson and Treitel, *Geophysical Signal Analysis*, Prentice-Hall, Inc., Englewood Cliffs, N.J., pp. 140-161, 1980.

Miller and Pursey, "The Field and Radiation Pattern of Mechanical Radiators on the Free Surface of a Semi-Infinite Isotropic Solid", Proceedings of the Royal Society (London), Ser. A, 223, pp. 521-541, 1954.

Berkhout, *Seismic Resolution*, Geophysical Press, London, England, pp. 199-200, 1984.

Oppenheim and Schafer, *Digital Signal Processing*, Prentice-Hall, Inc., Englewood Cliffs, N.J., pp. 345-353, 1975.

Anstey, "Correlation Techniques—A Review", reprinted in *Vibroseis*, Geophysics reprint series, Society of Exploration Geophysics, 1989, pp. 25-52.

Ristow and Jurczyk, "Vibroseis Deconvolution", reprinted in *Vibroseis*, Geophysics reprint series, Society of Exploration Geophysics, 1989, pp. 620-636.

Lines and Clayton, "A New Approach to Vibroseis Deconvolution", reprinted in *Vibroseis*, Geophysics reprint series, Society of Exploration Geophysics, 1989, pp. 637-653.

*Primary Examiner*—J. Woodrow Eldred
*Attorney, Agent, or Firm*—Keith A. Bell

[57] ABSTRACT

A method for processing seismic vibrator data. The method utilizes a deterministic signature deconvolution of the vibrator data to compress the impulse response of the data resulting in sharper, clearer seismic images than are possible using cross-correlation techniques. The method may be used in place of or in addition to cross-correlation. Further, the method may be implemented in either the time domain or the frequency domain.

20 Claims, 2 Drawing Sheets

SEISMIC VIBRATOR SIGNATURE DECONVOLUTION

FIELD OF THE INVENTION

This invention relates to the field of seismic data processing and, more particularly, to processing of the seismic data resulting from use of a land or marine seismic vibrator.

BACKGROUND OF THE INVENTION

In the oil and gas industry, geophysical prospecting techniques are typically used to aid in the search for and evaluation of subterranean hydrocarbon deposits. Many of these geophysical prospecting techniques utilize an impulsive seismic source, such as dynamite or a marine air gun, to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

The objective of all seismic data processing is to extract from the data as much information as possible regarding the subsurface formations. This objective could best be achieved if the energy propagated into the earth were truly an impulse. As will be well known to those skilled in the art, an idealized, true impulse is one which has zero time duration and contains all frequencies from zero to infinity in equal strength and at zero phase. The reflected signal would then be referred to as the true "impulse response" of the earth (i.e., the response of the earth to the input of an impulse). Such an idealization can, of course, never be actually achieved. In practice, the signal that is typically imparted into the earth by an impulsive source has a short time duration (i.e., a few milliseconds) and is band-limited (i.e., contains all frequencies up to some upper limit), but with the higher frequencies attenuated relative to the lower ones.

The actual signal recorded by the seismic detectors can be represented as a convolution of the signal that is actually imparted into the earth with the desired impulse response of the earth and a number of other filtering actions or events, such as multiple reflections, which altered the signal as it propagated through the earth from the source to the detector. In order to properly interpret the data, the desired impulse response of the earth must be separated from the recorded signal, and the objectionable effects of the other filtering actions must be removed. The process for doing so is generally called "deconvolution" and has been practiced for many years. There are several different types of deconvolution, two of which, "adaptive" deconvolution (also known as "statistical" or "predictive" deconvolution)and "deterministic" deconvolution, are further described below.

The deconvolution typically used in conventional processing of seismic data from an impulsive source is an adaptive deconvolution in which the deconvolution filter is derived, in either the time domain or the frequency domain, from an estimate of the bandwidth of the signal imparted into the earth. In other words, the bandwidth of the signal is estimated from the recorded data and a deconvolution filter is derived that can be applied to the data to give an estimate of the impulse response of the earth. This process is also called, among other things, a spiking deconvolution, adaptive whitening, and adaptive signal shortening.

Adaptive deconvolution is also used in a variety of other seismic data processing applications. For example, in marine seismic prospecting the energy propagated into the earth is the direct downgoing energy as well as a delayed version of the original signal (i.e., a ghost signal) produced by reflection of upgoing energy from the water surface. In this situation, the resulting seismic data will include both reflections of the actual signal and reflections of the ghost signal. Adaptive deconvolution can be used to design a "deghosting" filter to remove the ghost reflections from the data. Another problem in marine seismic prospecting is the ringing or reverberation of energy within the water layer. The process of removing these reverberations from the data (dereverberation) is accomplished by an adaptive deconvolution.

In contrast with adaptive deconvolution, the process of deterministic deconvolution makes use of a known source spectrum. Instead of estimating the source spectrum from the recorded data, actual measurements of the outgoing signal may be made on designated monitors. Using this measured signal and the recorded data, it is possible to determine what the reflected signal would have been if the input signal had been a true impulse. See, Arya and Holden, "A Geophysical Application: Deconvolution of Seismic Data", pp 324–338 of *Digital Signal Processing,* Western Periodicals Co., N. Hollywood, Calif., 1979. This deterministic deconvolution may then be followed by an adaptive deconvolution to compensate for some of the other effects discussed earlier.

The deterministic deconvolution process disclosed by Arya and Holden has certain disadvantages which limit its utility. Measurement of the outgoing signal is expensive and, in some environments, such as a shallow water marine environment, can be very difficult to do. Furthermore, additional processing has to be done to the signal recorded on the monitors before a deconvolution filter can be derived. This is because the signal recorded by the monitors has to be corrected for the source radiation pattern, ghosting, and other effects resulting from its passage through the medium between the source and the monitor.

In the late 1950s and early 1960s, Conoco Inc. pioneered development of a new type of geophysical prospecting technique, generally known as "vibroseis" prospecting. Vibroseis prospecting employs a land or marine seismic vibrator rather than an impulsive energy source. The seismic vibrator is used to generate a controlled wavetrain which propagates through the earth to the seismic detectors. Typically, a sinusoidal vibration of continuously varying frequency is applied to the surface of the earth (or in the body of water) during a sweep period lasting from two to 20 seconds or even more. The frequency may be varied linearly or nonlinearly with time. Also, the frequency may begin low and increase with time (upsweep), or it may begin high and gradually decrease (downsweep).

Recently, a new type of signal known as a "shaped-sweep" has been developed for use in vibroseis prospecting. This shaped-sweep technology is disclosed in co-pending U.S. patent application Ser. No. 08/086776 filed Jul. 1, 1993. One benefit of using a shaped-sweep is that the sweep is designed to have an optimum pulse length and a desirable impulse response spectrum which facilitates subsequent data processing activities.

The seismic data recorded during vibroseis prospecting (hereinafter referred to as "vibrator data") is a composite signal consisting of many long reflected wavetrains superimposed upon one another. Since this composite signal is typically many times longer than the interval between reflections, it is not possible to distinguish individual reflections on the recorded signal. Thus, the first step in conventional processing of vibrator data is to cross-correlate the recorded data with the sweep signal. See e.g., Kirk, P., "Vibroseis Processing", Chapter 2 of *Developments in Geophysical Exploration Methods—2*, edited by A. Fitch, Applied Science Publishers Ltd., London, 1981, pp. 37–52. This cross-correlation compresses the length of the impulse response of the data from several seconds to tens of milliseconds so that the correlated data approximates the data that would have been recorded if the source had been an impulsive source. Following this cross-correlation, processing of the vibrator data may proceed in much the same manner as processing of data from an impulsive source.

The cross-correlation process has some undesirable consequences. The cross-correlated data represent the response of the earth to the autocorrelation of the input signal, rather than to the input signal itself. In other words, the cross-correlation process results in zero-phase data. Because of this, the data are no longer causal (i.e., having a definite inception in time), but are non-causal (i.e., the effects of a reflector will become evident even before the signal reaches it). Other processes commonly used in seismic data processing, such as dereverberation, assume causality, and the filters derived in these processes may be incorrect with respect to non-causal data. A second, practical limitation of the cross-correlation process is that a certain amount of tapering of the frequency spectrum of the vibroseis signal is necessary. Because the cross-correlation process squares the amplitude spectrum of the signal, the tapering is accentuated in the correlated data. This has the undesirable consequence, in the time domain, of producing a long, drawn out signal which tends to ring and makes interpretation of the data more difficult. Further, although the cross-correlation process does dramatically reduce the length of the impulse response of the data, further compression to more nearly approximate a true impulse would result in sharper, clearer seismic images with higher resolution than is currently possible with vibrator data.

From the foregoing, it can be seen that a need exists for a method of determining the impulse response of the earth in the processing of seismic vibrator data which overcomes the above-described problems resulting from the cross-correlation process.

SUMMARY OF THE INVENTION

The present invention is a method for processing the seismic data generated by a land or marine seismic vibrator. In its broadest embodiment, the inventive method comprises the steps of selecting a desired impulse response for the data, determining the signature for the data, using the desired impulse response and the signature to design a deconvolution filter, and performing a deterministic signature deconvolution of the seismic data using the deconvolution filter. The invention may be implemented in either the time domain or the frequency domain, although frequency domain implementation is generally preferable.

The inventive method may be used either in place of or in addition to cross-correlation. For uncorrelated data, the vibrator pilot signal (sweep signal) is used as the signature. For correlated data, the signature is the autocorrelation of the pilot signal. For land seismic data, these signatures should preferably be rotated by 90 degrees to represent the impulse response of the data gathering system.

The desired impulse response of the data is chosen so as to substantially minimize the length of the pulse in the time domain. Optionally, a phase shift may be applied to the impulse response spectrum to facilitate subsequent data processing operations.

Since both the desired impulse response and the vibrator pilot signal are known before the survey is actually conducted, the deconvolution filter can be designed in advance and applied to the data in the field as they are collected. Alternatively, the inventive method may be practiced at a data processing center.

BRIEF DESCRIPTION OF THE DRAWINGS

The present invention and its advantages will be better understood by referring to the following detailed description and the attached drawings in which.

Figure 1:
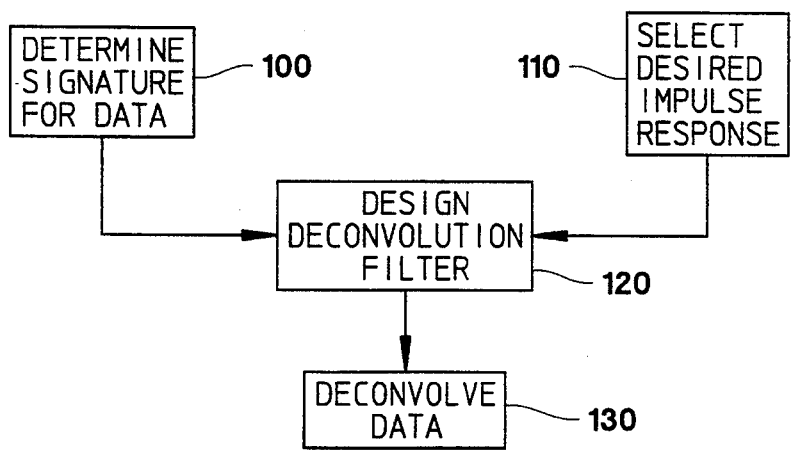
FIG. 1 is a flow chart illustrating the present invention in general.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

As noted above, the first step in conventional processing of land or marine seismic vibrator data is to cross-correlate the data with the input sweep signal. This cross-correlation results in a compression of the impulse response of the data so that they approximate data generated with an impulsive energy source. Following the cross-correlation, processing of the data may proceed in much the same manner as with other types of seismic data.

According to one embodiment of the present invention, the desired impulse response compression is achieved through a deterministic signature deconvolution of the uncorrelated data rather than through cross-correlation. In another embodiment of the invention, a deterministic signature deconvolution is performed after cross-correlation to further compress the impulse response of the data. These and other embodiments of the invention will be apparent to persons skilled in the art of seismic data processing based on the teachings set forth herein. To the extent that the following description of the invention is specific to a particular embodiment or a particular use, this is intended to be illustrative and is not to be construed as limiting the scope of the invention.

The present invention may be used with any type of land or marine seismic survey which uses a vibrator as the energy source, including surface seismic surveys, vertical seismic profiling and reverse vertical seismic profiling surveys, and cross-hole tomographic surveys. Use of a deterministic signature deconvolution in place of or in addition to a routine cross-correlation results in shorter, sharper pulses than are possible using cross-correlation alone. Consequently, the present invention facilitates better performance of subsequent data processing steps which, in turn, leads to sharper, clearer seismic images. In particular, Wiener statistical deconvolution, stacking, and migration are all improved if the impulse response of the data is shortened. Sharper seismic images lead to more detailed and accurate seismic interpretation and, hence, to better reserve calculations and lower drilling risks. Furthermore, because the deterministic signature deconvolution is based on the desired impulse response and the input sweep signal, both of which are known before the survey is actually conducted, the deconvolution filter can be designed in advance and applied to the data in the field as they are collected. Alternatively, the inventive method may be applied at a data processing center after the data have been collected. These and other advantages of the invention are achieved without any significant increases in data processing costs.

As illustrated in FIG. 1, in its broadest embodiment the present inventive method comprises the steps of determining the signature for the seismic data 100, selecting a desired impulse response for the data 110, using the desired impulse response and the signature to design a deconvolution filter 120, and performing a deterministic signature deconvolution of the data using the deconvolution filter 130. The first two steps of the inventive method are independent of each other and may be performed simultaneously or in either order.

As will be apparent to those skilled in the art of seismic data processing, the inventive method may be implemented (i) in the time domain using, for example, the Wiener normal equations (see e.g., Robinson and Treitel, *Geophysical Signal Analysis,* Prentice-Hall, Inc., Englewood Cliffs, N.J., 1980) or (ii) in the frequency domain using Fourier analysis techniques. Frequency domain implementation is believed to be preferable because deconvolution is generally more efficient in the frequency domain than in the time domain. Additionally, the desired impulse response is usually easier to specify in the frequency domain than in the time domain, and noise added in the frequency domain to stabilize the deconvolution can be implemented so that only the amplitude spectrum of the signal is distorted while time domain deconvolution adds noise which distorts both the amplitude and phase of the signal. Therefore, the remainder of the description of the invention will be directed to the frequency domain implementation. Time domain implementation of the invention will be readily apparent to persons skilled in the art based on the following description of the frequency domain implementation.

Figure 2:
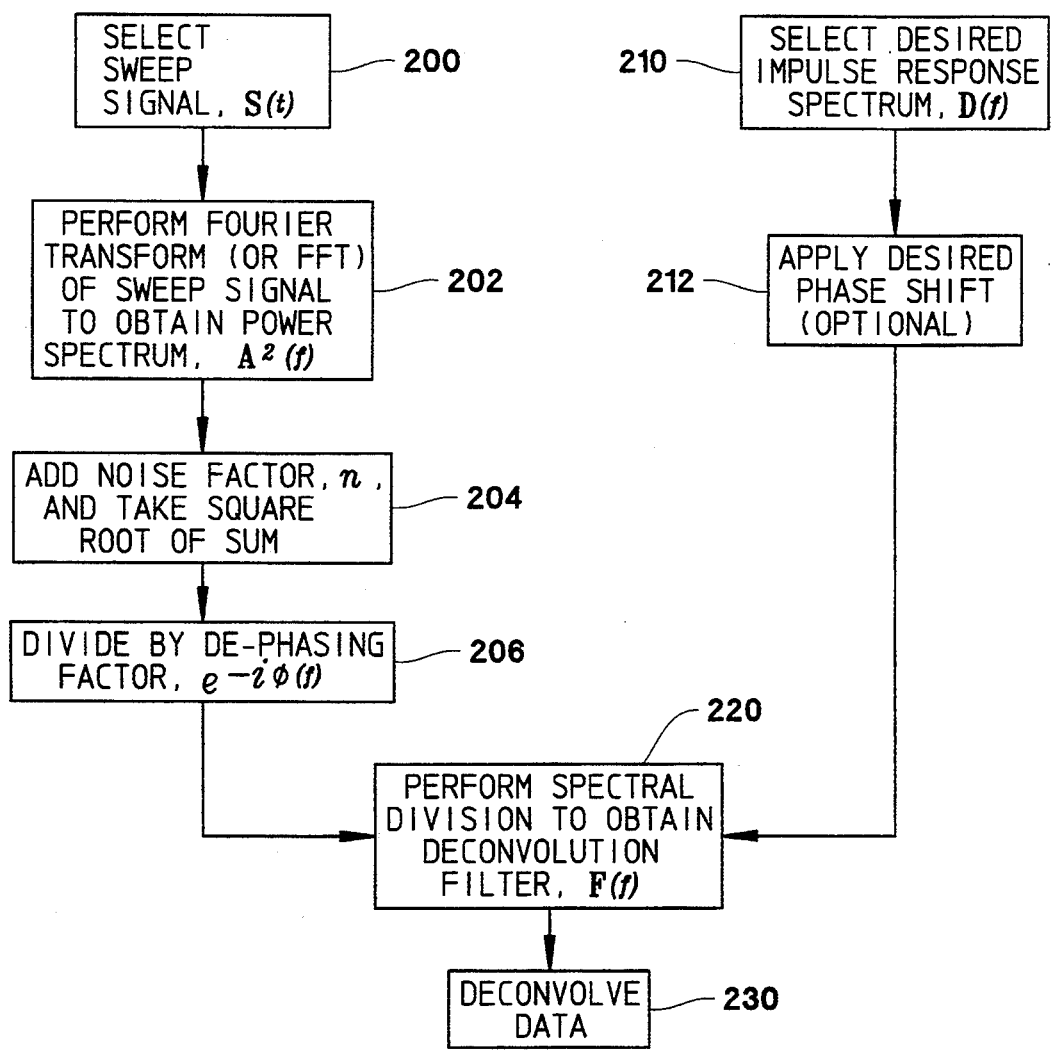
FIG. 2 is a flow chart illustrating frequency domain implementation of the invention for uncorrelated data.
Figure 3:
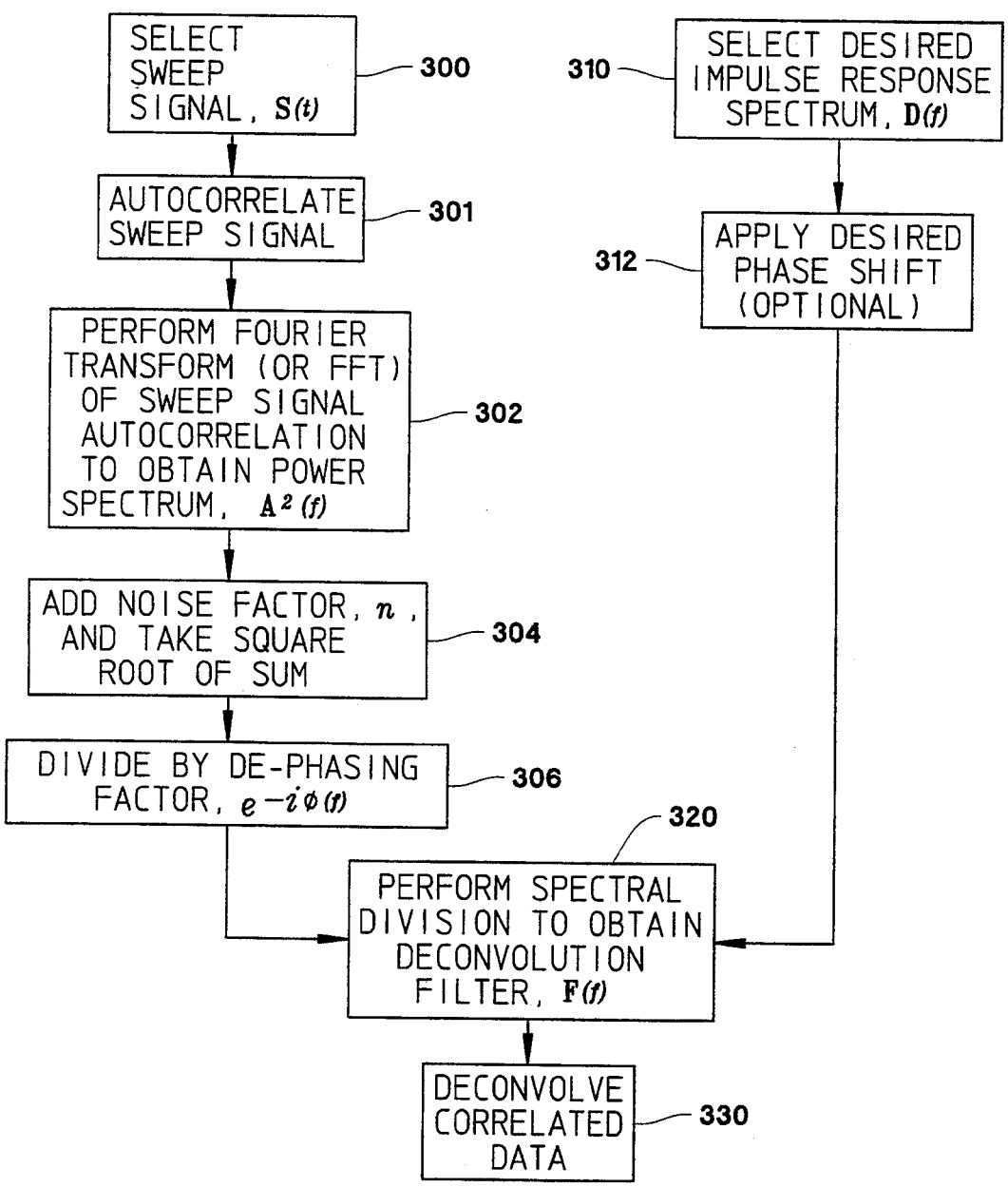
FIG. 3 is a flow chart illustrating frequency domain implementation of the invention for correlated data.

FIG. 2 and FIG. 3 illustrate frequency domain implementation of the invention for uncorrelated data and correlated data, respectively. For uncorrelated vibrator data, the signature is the vibrator pilot signal (i.e., the sweep signal). For correlated data, the signature is the autocorrelation of the pilot signal. In the case of land seismic data, these signatures should preferably be rotated by 90 degrees to represent the impulse response of the data gathering system. This 90 degree rotation is due to the fact that the pilot sweep is used to drive the force on the vibrator base plate. However, the seismic data recorded by the data gathering system is proportional to the velocity of the signal. It is well known that sonic velocity is related by a derivative to the force on the vibrator base plate which results in the 90 degree rotation. See, Miller and Pursey, "The Field and Radiation Pattern of Mechanical Radiators on the Free Surface of a Semi-Infinite Isotropic Solid", Proceedings of the Royal Society (London), Ser. A, 223, pp. 521–541, 1954. Implementation of this 90 degree rotation would be well known to a person of ordinary skill in the art and, accordingly, will not be further described herein.

Turning now to FIG. 2, the first step, indicated at 200, is to select the sweep signal S(t) as the signature for the data. The sweep signal is the electronic signal that is used to control the vibrator, and as noted above, it is typically a sinusoidal signal of continuously varying frequency. Also, in the case of land seismic data, the 90 degree rotation described above should preferably be applied to the sweep signal. The next step, indicated at 202, is to perform a Fourier transform (or a fast Fourier transform) of the sweep signal, S(t), to obtain the power spectrum for the sweep signal, $A^2(f)$. As will be well known to those skilled in the art, the power spectrum may have certain frequencies at which its value is zero. Therefore, as indicated at 204, a noise factor, n, is added to the power spectrum in order to stabilize the spectral division, as further described below. Also, the square root of the sum of the power spectrum and the noise factor is determined for use in the spectral division described below. In step 206, the result of step 204 is de-phased by dividing it by a de-phasing factor, $e^{-i\phi(f)}$, as will be well known to persons skilled in the art. In the de-phasing factor, $\phi(f)$ is the phase spectrum of the signature.

In parallel with steps 200, 202, 204, and 206, the desired impulse response spectrum of the earth, $D(f)$, is selected, as indicated at 210. D(f) is specified by a spectrum of amplitudes as a function of frequency. In addition, it may be desirable to apply an optional phase shift, indicated at 212, to the desired impulse response spectrum in order to facilitate subsequent data processing operations. The choice of the impulse response spectrum and the optional phase shift will be further described below.

Next, a spectral division is performed, as indicated at 220, to obtain the deconvolution filter $F(f)$. At each frequency, the filter is the ratio of two numbers. The numerator is the desired impulse response (with optional phase shift) and the denominator is the square root of the power spectrum of the sweep signal (with the added noise factor) divided by the de-phasing factor. Mathematically, this may be expressed as follows:

$$F(f) = \frac{D(f)}{\sqrt{A^2(f) + n} \; / e^{-i\phi(f)}} \tag{1a}$$

Formula (1a) may be rearranged as follows:

$$F(f) = D(f) \frac{e^{-i\phi(f)}}{\sqrt{A^2(f) + n}} \quad (1b)$$

The deconvolution filter is then used to filter (deconvolve) the uncorrelated data, as indicated at 230.

As noted above, FIG. 3 illustrates frequency domain implementation of the inventive method for correlated data. As with uncorrelated data, the first step 300 is to select the sweep signal, S(t). The next step 301 is to autocorrelate the sweep signal. A Fourier transform (or fast Fourier transform) of the autocorrelation of the sweep signal is then performed, as indicated at 302, to obtain the power spectrum, $A^2(f)$. The deconvolution filter, F(f), resulting from the spectral division 320 is applied to the correlated data, as indicated at 330. All other steps (304, 306, 310, and 312) are identical to those previously described with respect to uncorrelated data.

Figure 4:
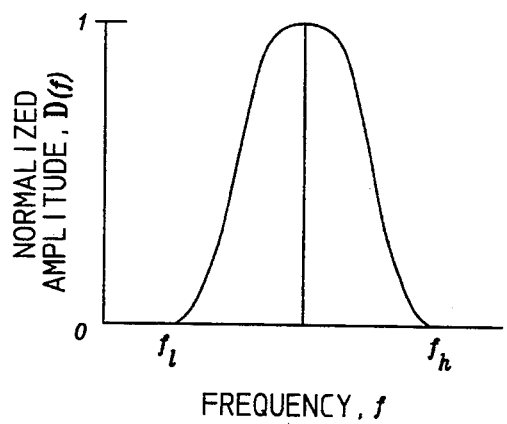
FIG. 4 illustrates the theoretical impulse response spectrum for a minimum length pulse for a finite range of frequencies.

The desired impulse response, D(f), comprises an amplitude spectrum which specifies the amplitude of the desired wavelet as a function of frequency. The impulse response should be chosen so as to substantially minimize the length of the pulse in the time domain. This will lead to the optimum separation of a wide variety of events on the seismic image. For a finite range of frequencies, the impulse response which will give the minimum pulse length may be determined from the following formula:

$$D(f) = \sin\left(\pi \frac{f - f_l}{f_h - f_l}\right) \quad (2)$$

where $f$ is frequency, $f_l$ is the lowest frequency in the range of frequencies, and $f_h$ is the highest frequency in the range of frequencies. See, Berkhout, *Seismic Resolution*, Geophysical Press, London, England, 1984. FIG. 4 illustrates the amplitude spectrum resulting from equation (2). The time domain equivalent of this spectrum has a very short pulse and is highly desirable for seismic interpreters because of its high resolution.

Figure 5:
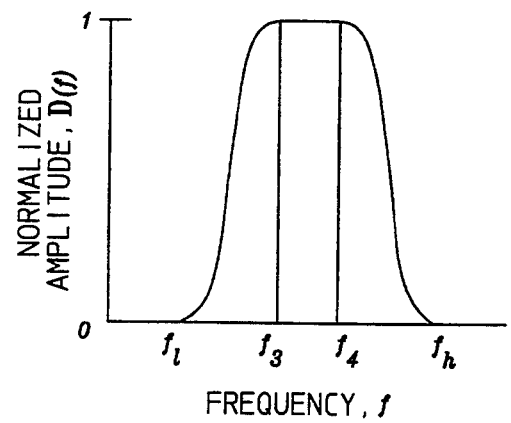
FIG. 5 illustrates the preferred impulse response spectrum for a minimum length pulse for a finite range of frequencies.

Although equation (2) theoretically gives the shortest possible pulse for the specified frequency range, the pulse tends to be "ringy". In other words, the time domain representation of the pulse has many side lobes and zero crossings which do not decay rapidly. In actual practice, it has been found that better results are obtained when D(f) is determined from the following formulas:

$$D(f) = \sin^2\left(\frac{\pi}{2} \frac{f - f_l}{f_3 - f_l}\right) \quad \text{for } f_3 > f > f_l \quad (3)$$

$$D(f) = 1 \quad \text{for } f_4 \geq f \geq f_3 \quad (4)$$

$$D(f) = \sin^2\left(\frac{\pi}{2} \frac{f_h - f}{f_h - f_4}\right) \quad \text{for } f_h > f > f_4 \quad (5)$$

$$D(f) = 0 \quad \text{for } f < f_l \text{ or } f > f_h \quad (6)$$

where $f_3 = f_l + 0.4(f_h - f_l)$ and $f_4 = f_h - 0.4(f_h - f_l)$ are frequencies defining a 20% flat spectrum between the lower and upper limits, $f_l$ and $f_h$. The amplitude spectrum resulting from equations (3) through (6) is illustrated in FIG. 5. The time domain equivalent of this amplitude spectrum also has a very short pulse and is highly desirable to seismic interpreters because of its high resolution. Squaring the spectrum does two things. First, it makes the slope (i.e., the first derivative) of the spectrum continuous at the boundaries which means that the discontinuity at the lowest and highest frequencies is higher order and, consequently, leads to less ringing in the resulting pulse. Second, in practice, the lower cut off rate at the lowest and highest frequencies means that a lower $f_l$ and a higher $f_h$ can be chosen using equations (3) through (6) than is possible using equation (2), as more fully described below.

A vibrator sweep typically generates frequencies above and below the "sweep range". Therefore, $f_l$ and $f_h$ can be chosen lower and higher than the sweep range, respectively. The faster cutoff rate of equations (3) and (5) allows the $f_l$ and $f_h$ to be picked even lower and higher respectively than equation (2) allows. This extra bandwidth makes up for the fact that theoretically equations (3) through (6) yield a longer pulse than equation (2) for the same frequency range. In practice, the pulse from equations (3) through (6) is as short or shorter than the pulse from equation (2) and is less ringy.

As noted above, it may be desirable to apply an optional phase shift (step 212 in FIG. 2 and step 312 in FIG. 3) to the desired impulse response spectrum. The purpose of this phase shift is to change the impulse response spectrum from zero phase to minimum phase (i.e., causal, but with a phase spectrum that minimizes the impulse response time duration). This facilitates subsequent processing of the data. For example, Wiener predictive deconvolution which is used to remove multiple reflections from the data usually assumes that the data are minimum phase. Therefore, in preparation for running this step, it is advantageous to make the phase spectrum of the desired impulse response minimum phase. A minimum phase spectrum can be calculated by taking the Hilbert transform of the natural logarithm of the amplitude spectrum, as will be well known to persons skilled in the art of seismic data processing (see e.g., Oppenheim and Schafer, *Digital Signal Processing*, Prentice-Hall, Inc., Englewood Cliffs, N.J. 1975). Accordingly, the process of applying a phase shift to the desired impulse response spectrum will not be further described herein.

The present invention may be applied to all types of land or marine vibrator data, including that resulting from the new shaped-sweep technology referenced above. However, for shaped-sweep data, it is not necessary to use equations (3) through (6) to determine the desired impulse response for the data since the amplitude spectrum of shaped-sweep data is already optimum. For shaped-sweep data, all that is necessary is to perform a deterministic signature deconvolution of the data and, optionally, to change the phase to minimum phase. For land seismic data, the 90 degree rotation discussed above should preferably be applied.

The equations set forth above are illustrative examples of equations that can be used for frequency domain implementation of the present invention. However, they are not to be considered as limiting the scope of the invention. Those skilled in the art will recognize that the particular equations used to implement the invention in the frequency domain are a matter of convenience and personal preference. Also, as noted above, the invention may also be implemented in the time domain. All of these implementations are deemed to be within the scope of the invention.

I claim:

1. A method for processing seismic data generated by a seismic vibrator, said method comprising the steps of:
   (a) selecting a desired impulse response for said seismic data;
   (b) selecting a pilot signal for said seismic vibrator and using said pilot signal to determine the signature for said seismic data;
   (c) using said desired impulse response and said signature to design a deconvolution filter; and
   (d) performing a deterministic deconvolution of said seismic data using said deconvolution filter.

2. The method of claim 1, wherein said signature is the pilot sweep for said seismic vibrator.

3. The method of claim 1, wherein said seismic data is cross-correlated seismic data and said signature is the autocorrelation of the pilot sweep for said seismic vibrator.

4. The method of claim 1, wherein said desired impulse response for said seismic data is determined according to the following formula:

$$D(f) = \sin\left(\pi \frac{f - f_l}{f_h - f_l}\right)$$

where $D(f)$ is the desired impulse response as a function of frequency; $f$ is frequency; $f_l$ is the lowest frequency in said seismic data; and $f_h$ is the highest frequency in said seismic data.

5. The method of claim 1, wherein said desired impulse response for said seismic data is determined according to the following formulas:

$$D(f) = \sin^2\left(\frac{\pi}{2} \frac{f - f_l}{f_3 - f_l}\right) \text{ for } f_3 > f > f_l$$

$$D(f) = 1 \text{ for } f_4 \geq f \geq f_3$$

$$D(f) = \sin^2\left(\frac{\pi}{2} \frac{f_h - f}{f_h - f_4}\right) \text{ for } f_h > f > f_4$$

$$D(f) = 0 \text{ for } f < f_l \text{ or } f > f_h$$

where $D(f)$ is the desired impulse response as a function of frequency; $f$ is frequency; $f_l$ is the lowest frequency in said seismic data; $f_h$ is the highest frequency in said seismic data; $f_3 = f_l + 0.4(f_h - f_l)$; and $f_4 = f_h - 0.4(f_h - f_l)$.

6. The method of claim 1, wherein the phase spectrum of the desired impulse response is minimum phase.

7. The method of claim 1, wherein said deconvolution filter is designed in the frequency domain according to the following formula:

$$F(f) = D(f) \frac{e^{-i\phi(f)}}{\sqrt{A^2(f) + n}}$$

where $F(f)$ is the deconvolution filter as a function of frequency; $D(f)$ is the desired impulse response as a function of frequency; $\phi(f)$ is the phase spectrum of the signature; $A^2(f)$ is the power spectrum of the signature; and n is a noise factor added to stabilize the division.

8. The method of claim 1, wherein said deconvolution filter is designed in the time domain using the Wiener normal equations.

9. A method for processing uncorrelated seismic data generated by a seismic vibrator, said method comprising the steps of:
   (a) selecting a desired impulse response for said seismic data;
   (b) selecting the vibrator pilot sweep as the signature for said seismic data;
   (c) using said desired impulse response and said vibrator pilot sweep to design a deconvolution filter; and
   (d) performing a deterministic deconvolution of said uncorrelated seismic data using said deconvolution filter.

10. The method of claim 9, wherein said desired impulse response for said seismic data is determined according to the following formula:

$$D(f) = \sin\left(\pi \frac{f - f_l}{f_h - f_l}\right)$$

where $D(f)$ is the desired impulse response as a function of frequency; $f$ is frequency; $f_l$ is the lowest frequency in said seismic data; and $f_h$ is the highest frequency in said seismic data.

11. The method of claim 9, wherein said desired impulse response for said seismic data is determined according to the following formulas:

$$D(f) = \sin^2\left(\frac{\pi}{2} \frac{f - f_l}{f_3 - f_l}\right) \text{ for } f_3 > f > f_l$$

$$D(f) = 1 \text{ for } f_4 \geq f \geq f_3$$

$$D(f) = \sin^2\left(\frac{\pi}{2} \frac{f_h - f}{f_h - f_4}\right) \text{ for } f_h > f > f_4$$

$$D(f) = 0 \text{ for } f < f_l \text{ or } f > f_h$$

where $D(f)$ is the desired impulse response as a function of frequency; $f$ is frequency; $f_l$ is the lowest frequency in said seismic data; $f_h$ is the highest frequency in said seismic data; $f_3 = f_l + 0.4(f_h - f_l)$; and $f_4 = f_h - 0.4(f_h - f_l)$.

12. The method of claim 9, wherein the phase spectrum of the desired impulse response is minimum phase.

13. The method of claim 9, wherein said deconvolution filter is designed in the frequency domain according to the following formula:

$$F(f) = D(f) \frac{e^{-i\phi(f)}}{\sqrt{A^2(f) + n}}$$

where $F(f)$ is the deconvolution filter as a function of frequency; $D(f)$ is the desired impulse response as a function of frequency; $\phi(f)$ is the phase spectrum of the signature; $A^2(f)$ is the power spectrum of the signature; and n is a noise factor added to stabilize the division.

14. The method of claim 9, wherein said deconvolution filter is designed in the time domain using the Wiener normal equations.

15. A method for processing cross-correlated seismic data generated by a seismic vibrator, said method comprising the steps of:
   (a) selecting a desired impulse response for said seismic data;

(b) selecting the vibrator pilot sweep as the signature for said seismic data;

(c) determining the autocorrelation of said vibrator pilot sweep;

(d) using said desired impulse response and said autocorrelation of said vibrator pilot sweep to design a deconvolution filter; and (e) performing a deterministic deconvolution of said cross-correlated seismic data using said deconvolution filter.

16. The method of claim 15, wherein said desired impulse response for said seismic data is determined according to the following formula:

$$D(f) = \sin\left(\pi \frac{f - f_l}{f_h - f_l}\right)$$

where $D(f)$ is the desired impulse response as a function of frequency; $f$ is frequency; $\eta_l$ is the lowest frequency in said seismic data; and $f_h$ is the highest frequency in said seismic data.

17. The method of claim 15, wherein said desired impulse response for said seismic data is determined according to the following formulas:

$$D(f) = \sin^2\left(\frac{\pi}{2} \frac{f - f_l}{f_3 - f_l}\right) \quad \text{for } f_3 > f > f_l$$

$$D(f) = 1 \quad \text{for } f_4 \geq f \geq f_3$$

$$D(f) = \sin^2\left(\frac{\pi}{2} \frac{f_h - f}{f_h - f_4}\right) \quad \text{for } f_h > f > f_4$$

$$D(f) = 0 \quad \text{for } f < f_l \text{ or } f > f_h$$

where $D(f)$ is the desired impulse response as a function of frequency; $f$ is frequency; $f_l$ is the lowest frequency in said seismic data; $f_h$ is the highest frequency in said seismic data; $f_3 = f_l + 0.4(f_h - f_l)$; and $f_4 = f_h - 0.4(f_h - f_l)$.

18. The method of claim 15, wherein the phase spectrum of the desired impulse response is minimum phase.

19. The method of claim 15, wherein said deconvolution filter is designed in the frequency domain according to the following formula:

$$F(f) = D(f) \frac{e^{-i\phi(f)}}{\sqrt{A^2(f) + n}}$$

where $F(f)$ is the deconvolution filter as a function of frequency; $D(f)$ is the desired impulse response as a function of frequency; $\phi(f)$ is the phase spectrum of the signature; $A^2(f)$ is the power spectrum of the signature; and $n$ is a noise factor added to stabilize the division.

20. The method of claim 15, wherein said deconvolution filter is designed in the time domain using the Wiener normal equations.

* * * * *